United States Patent
Komiyama et al.

(10) Patent No.: US 6,799,650 B2
(45) Date of Patent: Oct. 5, 2004

(54) HYBRID VEHICLE

(75) Inventors: Susumu Komiyama, Yokohama (JP); Musashi Yamaguchi, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 139 days.

(21) Appl. No.: 10/173,663

(22) Filed: Jun. 19, 2002

(65) Prior Publication Data

US 2002/0195288 A1 Dec. 26, 2002

(30) Foreign Application Priority Data

Jun. 25, 2001 (JP) .......................................... 2001-190885

(51) Int. Cl.$^7$ ................................................ B60K 1/00
(52) U.S. Cl. ........................................... 180/65.2; 477/3
(58) Field of Search .............................. 180/65.2, 65.3, 180/65.4, 65.6; 701/22; 318/139; 477/2, 3, 4, 5; 290/40 B, 40 C, 40 F; 322/16, 14, 15

(56) References Cited

U.S. PATENT DOCUMENTS 6,190,283 B1 * 2/2001 Uchida ............................ 477/5
6,424,053 B1 * 7/2002 Wakashiro et al. ........ 290/40 C
6,480,767 B2 * 11/2002 Yamaguchi et al. ............ 701/22
2003/0051930 A1 * 3/2003 Matsubara et al. ......... 180/65.4

FOREIGN PATENT DOCUMENTS

| JP | 7-67209 A | 3/1995 |
| JP | 7-095703 A | 4/1995 |
| JP | 7-298408 A | 11/1995 |
| JP | 8-061105 A | 3/1996 |
| JP | 10-14296 A | 1/1998 |
| JP | 2000-092614 | 3/2000 |

* cited by examiner

Primary Examiner—Bryan Fischmann
(74) Attorney, Agent, or Firm—Foley & Lardner LLP

(57) ABSTRACT

A maximum charging power when a battery is warmed up is set, and a target rotation speed is set based on the sum of the engine output required to drive the vehicle and the maximum charging power. The target charging power when the battery is warmed up, is computed based on the charge state of the battery. The target torque of the engine is set by dividing the target engine output, obtained based on the sum of the engine output required to drive the vehicle and the target charging power, by the engine rotation speed. In the battery warm-up control, the rotation speed of the engine and generator is controlled to the target rotation speed, and the torque of the engine is controlled to the target torque.

11 Claims, 3 Drawing Sheets

HYBRID VEHICLE

FIELD OF THE INVENTION

This invention relates to a hybrid vehicle, and in particular, to a warm-up of a battery.

BACKGROUND OF THE INVENTION

A hybrid vehicle is a vehicle driven by a motor, and the required power is supplied from a generator driven by an engine. The engine is operated in a high fuel efficiency operating region as much as possible. The battery is charged by the excessive power generation and energy recovered when the vehicle decelerates. When the required driving force is large, power is supplied to the motor also from the battery.

The input/output characteristics of the battery depend on the battery temperature, and charging/discharging capability is restricted the more the battery temperature falls. Therefore, the performance of hybrid vehicles is largely influenced by the battery temperature, and the battery must be maintained at the proper temperature.

In JP2000-92614A published by the Japanese Patent Office in 2000, when battery temperature is low, charge and discharge of the battery is performed forcibly such that current passes through the battery. Heat is generated due to the internal resistance of the battery, and thus the battery is heated from inside. Specifically, when the present charge state of the battery has not reached the maximum charge state, the battery is charged, and the battery is discharged once the maximum charge state is reached.

SUMMARY OF THE INVENTION

However, this warm-up of the battery may also be performed when the vehicle is running, and if this is done during running of the vehicle, the engine rotation speed may change regardless of the driver's intention due to the charging/discharging of the battery, and may give the driver an uncomfortable feeling.

In order to charge the battery, the engine is operated at a larger output than the output required to drive the vehicle, and the power for charging is generated by the excess output. However, the power for charging varies with the charge state of the battery, and thus the output which is required of the engine also varies according to the charge state of the battery. If a large current is passed through the battery, warm-up of the battery is faster, but if an excessive current is passed, the life of the battery will be shortened, so it is desirable to charge with the maximum power which the battery can receive (power which can be input). For this reason, the target charging power is set according to the charge state of a battery. Also, the maximum power which can be output from the battery when discharging is performed is also determined according to the charge state of the battery.

As a result, when temperature control of the battery is performed, the target engine output varies regardless of the driver's intention, and the controlled engine output therefore varies accordingly.

In general, in a hybrid vehicle, to obtain the target engine output, as the operating point is determined by a combination of engine rotation speed and engine torque which gives the best engine efficiency at that output, if an engine output is varied as mentioned above, the engine rotation speed will also change accordingly, and an uncomfortable feeling will be imparted to the driver.

Moreover, if there is a change from charge to discharge or conversely due to battery temperature control, the target engine output will vary in a step manner. Thus, during engine output control accompanied by a variation of engine rotation speed, a response delay in the actual output occurs, and a discrepancy is produced between the target charging power and actual charging power.

It is therefore an object of this invention to prevent change of engine rotation speed during warm-up control of the battery, and prevent an uncomfortable feeling during driving.

In order to achieve above object, this invention provides a hybrid vehicle which includes a generator, an engine which drives the generator, a motor which drives the vehicle and a battery connected to the generator and motor, and performs Electric Vehicle (EV) running wherein the vehicle runs under the motor driven with electric power stored in the battery without operating the engine, and Hybrid Electric Vehicle (HEV) running wherein the engine is operated and the vehicle runs under at least one of the engine and the motor, comprising an external charge device which charges the battery using an external power supply, a map information device which includes map data and recognizes the present position of the vehicle on the map data, and a controller. The controller functions to register a point at which the external power supply is installed in the map data in the map information device as a base point, register an EV running area centered on the base point in the map data in the map information device, increase the charge value of the battery beforehand during HEV running before arriving at the EV running area, when the vehicle runs towards the base point from outside the EV running area, and switch to EV running when the vehicle enters the EV running area.

The details as well as other features and advantages of this invention are set forth in the remainder of the specification and are shown in the accompanying drawings.

DESCRIPTION OF THE PREFERRED EMBODIMENTS

Figure 1:
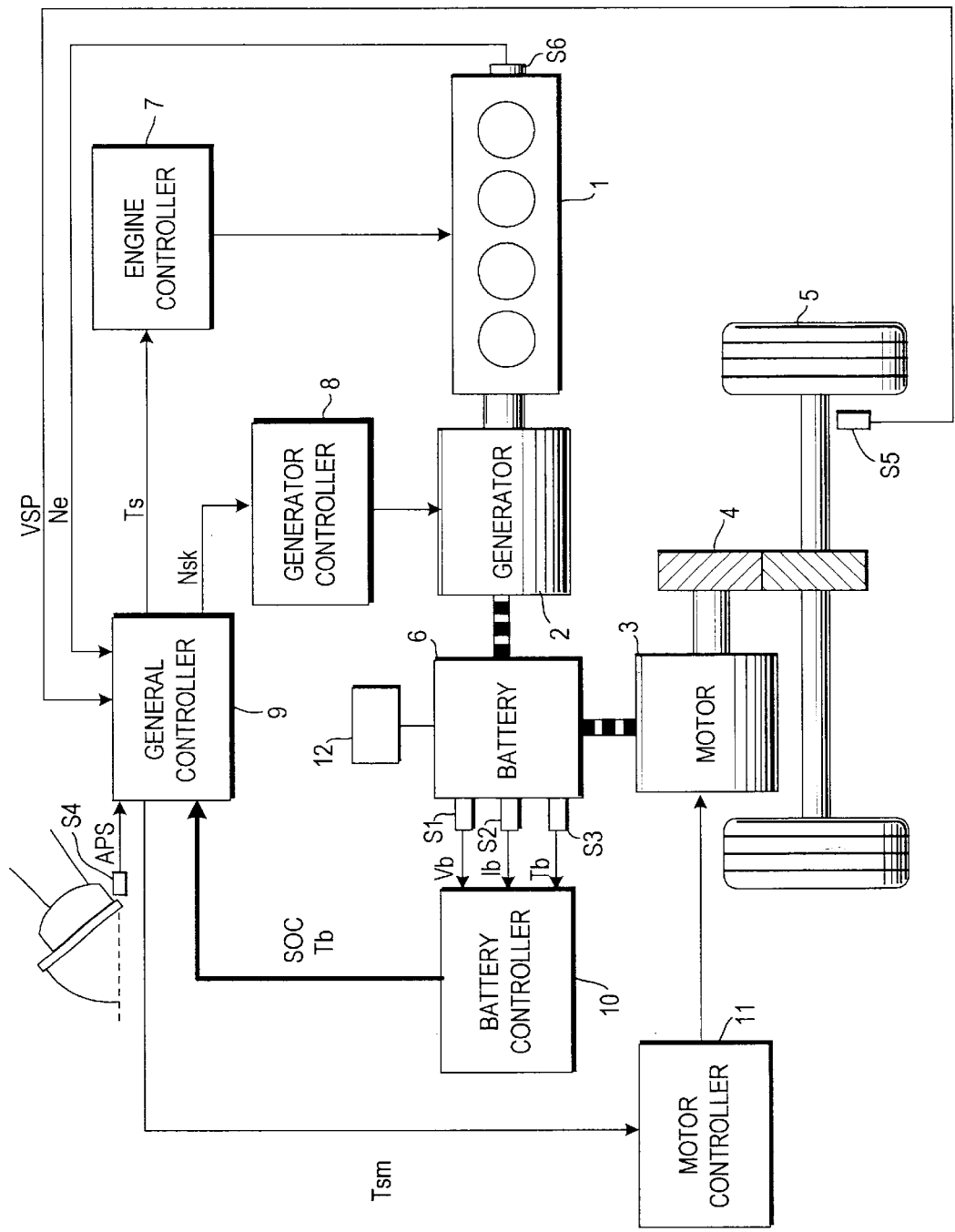
FIG. 1 is a schematic block diagram of a hybrid vehicle relating to this invention.

Referring to FIG. 1 of the drawings, a hybrid vehicle relating to this invention is provided with an engine 1, generator 2 connected to the output shaft of the engine 1, electric motor 3, drive wheels 5 connected to the motor 3 via a final gear 4, and a battery 6 electrically connected to the generator 2 and motor 3. Auxiliary devices 12, such as a cooling fan and an air-conditioner, are connected to the battery 6. The engine 1 is provided with an electronic control throttle valve for adjusting the output of the engine 1, and its opening degree can be adjusted independently of a driver's accelerator depression amount.

The generator 2 is driven by the engine 1. The power generated by the generator 2 is supplied to the motor 3, and the surplus is stored in the battery 6. The output rotation of the motor 3 is transmitted to the drive wheels 5 via the final gear 4 to drive the vehicle. When the power generation by the generator 2 is insufficient, power is supplied to the motor 3 from the battery 6, and generates the required driving force.

Based on an engine torque command value output from a general controller 9, an engine controller 7 increases or decreases the throttle valve opening which adjusts the output of engine 1, and controls the torque of the engine 1. Also, based on the rotation speed command value output from the general controller 9, a generator controller 8 controls the rotation speed of the generator 2, and controls the rotation speed of the engine 1 and generator 2.

In rotation speed control, a torque command value is determined according to the difference between the rotation speed command value and real rotation speed, and vector control of the generator 2 is performed so that the torque becomes the command value. At this time, the generator 2 generates power by absorbing engine torque.

A battery controller 10 computes the charge state SOC of the battery 6 based on the voltage Vb, current Ib and temperature Tb of the battery 6 detected by the voltage sensor S1, current sensor S2 and temperature sensor S3, and outputs the charge state SOC and the battery temperature Tb to the general controller 9. The charge state SOC of the battery 6 can be computed based on the voltage Vb of the battery 6 detected by the voltage sensor S1.

The motor controller 11 carries out vector control of the torque of the motor 3 based on a motor torque command value Tsm from the general controller 9.

Signals from an accelerator depression sensor S4 which detects an accelerator pedal depression amount APS, vehicle speed sensor S5 which detects the vehicle speed VSP and an engine rotation speed sensor S6 which detects the real rotation speed Ne of the engine 1, are input into the general controller 9. The general controller 9 outputs control command values to each controller described above based thereon, and controls the engine 1, generator 2 and motor 3 according to the driver's requirements. Moreover, the general controller 9 forcibly charges or discharges the battery 6 without varying the rotation speed of the engine 1 when the temperature Tb of the battery 6 falls rather below a specified value, and warms the battery up.

Figure 2:
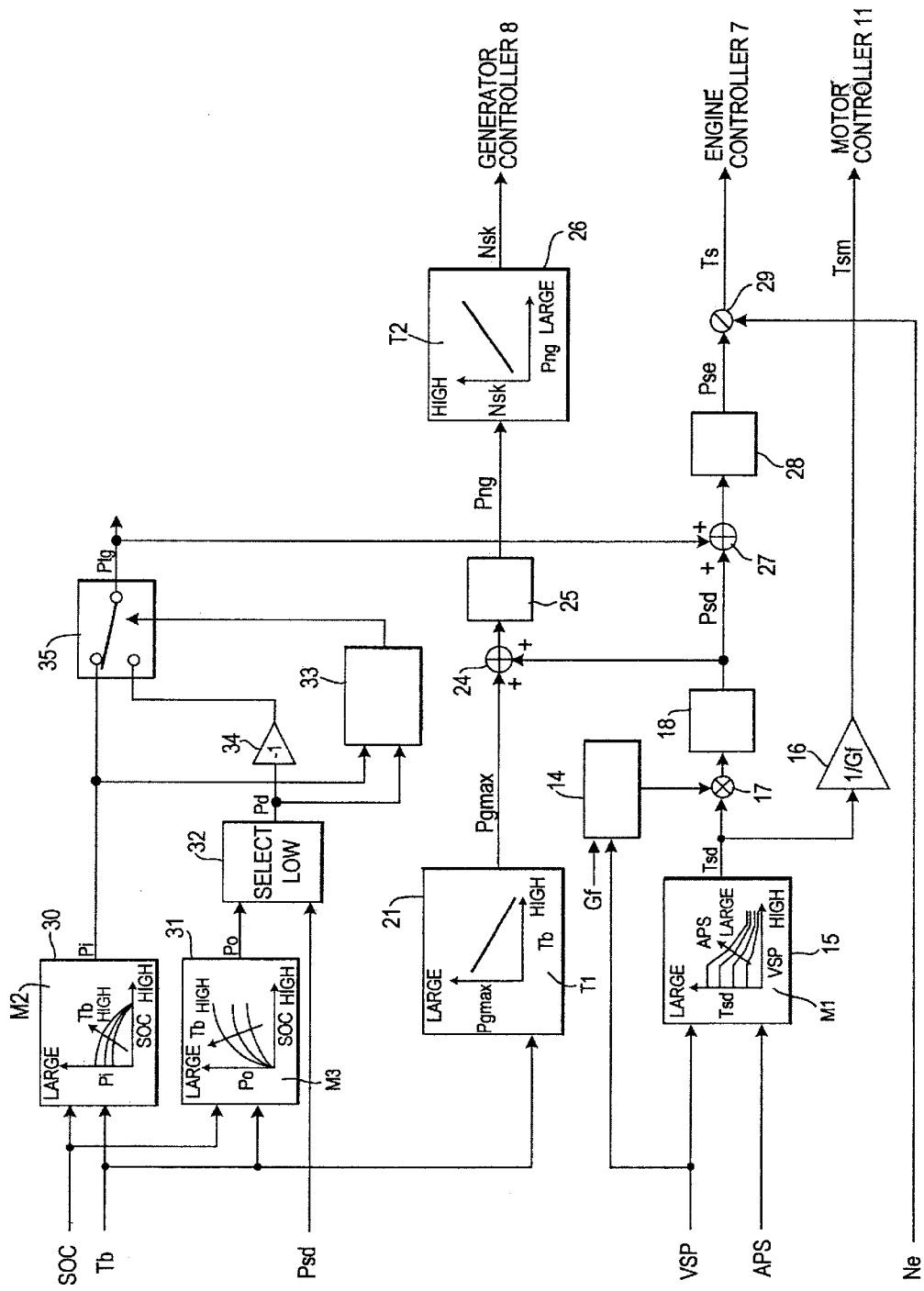
FIG. 2 is a control block diagram of a general controller of the vehicle.

The control details of the general controller 9 will be described referring to FIG. 2.

A block 15 calculates a target shaft driving force Tsd by looking up a map M1 based on the accelerator depression amount APS, and the vehicle speed VSP. The target shaft driving force Tsd increases the larger the accelerator depression amount APS becomes, and decreases if the vehicle speed VSP increases.

A block 16 calculates the torque command value Tsm of the motor 3 by dividing the target shaft driving force Tsd by the gear ratio Gf of the final gear 4. The motor torque command value Tsm is sent to the motor controller 11. The motor controller 11 performs vector control of the motor 3 based on this value.

A block 14 calculates a shaft rotation speed (real rotation speed of the motor 3) based on the vehicle speed VSP and the gear ratio Gf of the final gear 4. A multiplier 17 multiplies the target shaft driving force Tsd by the shaft rotation speed (real rotation speed of the motor 3) computed by the block 14, and computes the target drive power Psd.

In a block 18, the target drive power Psd is corrected by adding the power consumption of the auxiliary device 12 and the loss of the motor 3. The power consumption of the auxiliary device 12 may detected by detecting the power consumption of the auxiliary device 12 directly by a sensor, or it may be computed by deducting the power of the motor 3 and generator 2 from the actual charging/discharging power of the battery 6. The average power consumption and maximum rated power (fixed value) of the auxiliary device 12 may be used as the power consumption of the auxiliary device 12. Moreover, the loss of the motor 3 is computed by measuring the loss for different torques and rotation speeds of the motor 3, generating a motor loss map beforehand, and looking up this map based on the motor torque command value Tsm and the real rotation speed Ne of the motor 3.

On the other hand, in order to warm up the battery 6 when the temperature of the battery 6 is low, first in a block 21, a maximum warm-up charging amount Pgmax when the battery 6 is warmed up is computed by looking up a table T1 based on the temperature Tb of the battery 6 detected by the temperature sensor S3. The maximum warm-up charging amount Pgmax increases the lower the battery temperature Tb becomes, and decreases as the temperature Tb rises.

A block 30 calculates a permissible input power Pi which can be input to the battery 6 by looking up a map M2 based on the charge state SOC and temperature Tb of the battery 6. The permissible input power Pi is a maximum when the charge state SOC is 0%, decreases the higher the charge state SOC becomes and becomes zero when the charge state SOC is 100%. It also increases the higher the temperature Tb of the battery 6 becomes.

In a block 31, a permissible output power Po which can be output from the battery 6 is computed by looking up a map M3 based on the charge state SOC and temperature Tb of the battery 6. The permissible output power Po is a maximum when the charge state SOC is 100%, decreases the less the charge state SOC becomes, and becomes zero when the charge state SOC is 0%. It also increases the higher the temperature Tb of the battery 6 becomes.

In a block 32, the permissible output power Po of the battery 6 is compared with the aforesaid target drive power Psd, and the smaller of the two is selected as a discharge power Pd.

In a block 33, it is determined whether to charge or discharge based on the comparison between the permissible input power Pi and discharge power Pd of the battery 6. Specifically, charge is selected when the permissible input power Pi is larger than the discharge power Pd, and discharge is selected when the permissible input power Pi is smaller than the discharge power Pd.

In a block 35, the permissible input power Pi or the discharge power Pd of the battery 6 is output as a target charging amount Ptg based on the determination of the block 33. In a block 34, the symbol for the discharge power Pd is inverted in order to treat charging and discharging identically as "charging".

In a block 24, the target drive power Psd is added to the maximum warm-up charging amount Pgmax to compute a warm-up power Png of the battery 6. The warm-up power Png is corrected to a value obtained by adding the power loss of the generator 2 in the block 25. The estimation of the power loss of the generator 2 is performed by measuring the loss for each generated power and rotation speed of the generator 2 beforehand, generating a generator loss map, and looking up this map from the power it is desired to generate and the real rotation speed.

In a block 26, the minimum rotation speed of the engine 1 at which the warm-up power Png of the battery 6 can be output is found by looking up a table T2, and this is computed as a target rotation speed command value Nsk of the engine 1 and generator 2.

Figure 3:
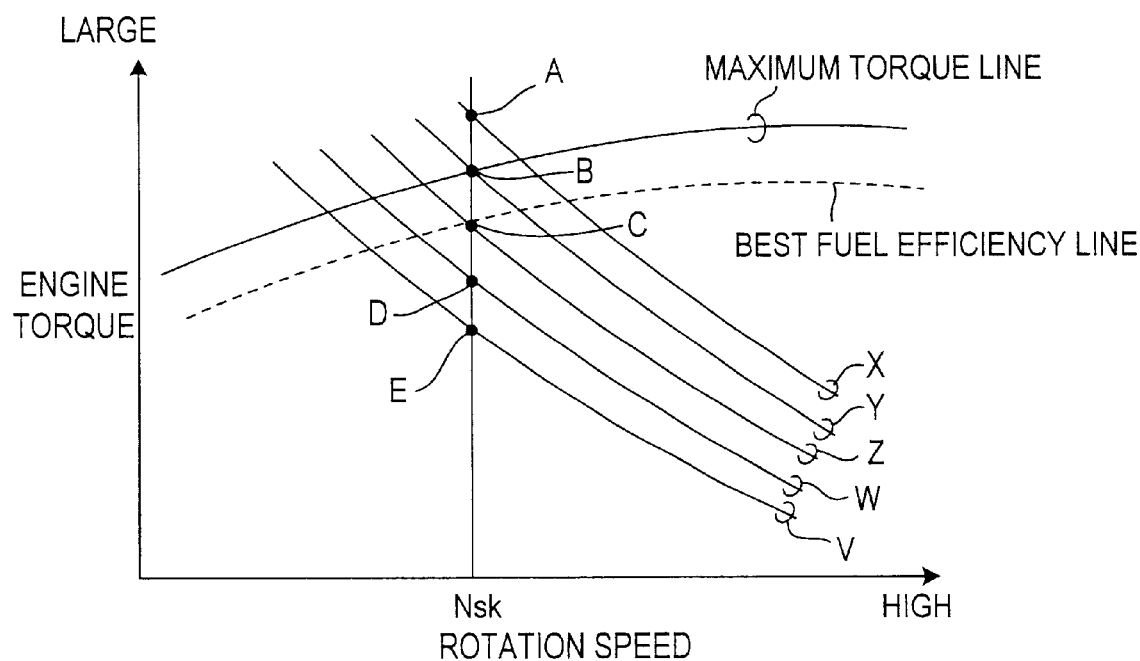
FIG. 3 is a diagram showing the operation when the vehicle battery is warmed-up.

The minimum rotation speed of the engine 1, which is the target rotation speed command value Nsk, can be set equal to the rotation speed at the intersection of the warm-up required power Png and engine maximum torque line (see FIG. 3). The target rotation speed command value Nsk may also be computed from the intersection of the warm-up power Png and best fuel efficiency line of the engine 1. In this case, the fuel cost-performance of the engine 1 during battery warm-up control is maintained at optimum.

When there is another target engine rotation speed command value determined from a fuel cost-performance requirement and excess drive power requirement apart from battery warm-up, the final target rotation speed command value is set to the larger of this other rotation speed command value and the target rotation speed command value Nsk. In this way, if the requirement other than the battery warm-up requirement is fuel-cost performance, the effect on fuel cost-performance can be suppressed to the minimum, or in the case of excess drive force requirement, excess drive force can be maintained simultaneously.

When three or more than three requirements are present, i.e., battery warm-up, fuel cost-performance, excess drive force or other requirements, impairment of fuel cost-performance can be avoided while satisfying all the requirements by setting the target rotation speed command value to the largest value among the target command values for these requirements.

The target rotation speed command value Nsk is output by the generator controller 8. The generator controller 8 performs rotation speed control of the generator 2 so that the rotation speed of the generator 2 which rotates at an identical rotation speed to that of the engine 1, coincides with the command value Nsk.

In addition, in an adder 27, the target drive power Psd is added to the target charging amount Ptg to compute a target engine output Pse. In a block 28, the loss of the generator 2 is corrected in the same way as in the block 25.

In a divider 29, the target engine output Pse is provided by the real engine rotation speed Ne to compute an engine torque command value (or target engine torque) Ts. Instead of the real engine rotation speed Ne, the target rotation speed command value Nsk may also be used.

The engine torque command value Ts is output to the engine controller 7. The engine controller 7 controls the output torque of the engine 1 by controlling the throttle valve opening of the engine 1 based thereon.

Next, the operation when the battery 6 is warmed up will be described referring to FIG. 3.

First, in FIG. 3, X is a constant power line of the target engine power Pse when the target charging amount Ptg is larger than the maximum warm-up charging amount Pgmax, Y is a constant power line of the battery warm-up power Prig, and Z is a constant power line of the target engine output Pse when the target charging amount Ptg is less than the maximum warm-up charging amount Pgmax, but larger than zero. W is a constant power line of the target drive power Psd, and V is a constant power line of the target engine output Pse when the target charging amount Ptg is less than zero.

When warm-up control of the battery 6 starts, the rotation speed of engine 1 and the generator 2 which is directly connected to the engine 1 is controlled to coincide with the target rotation speed command value Nsk. Here, the command value Nsk is the rotation speed at an intersection point B between the constant power line Y and the maximum torque line of the engine 1.

The engine torque is found by dividing the target engine output Pse by the real engine rotation speed (=target engine rotation speed). In the figure, the engine torque is the torque at the intersection point A, C or E between the constant power line X, Z or V and the engine rotation speed Nsk.

However, it is impossible to realize the torque at the point A, so the engine 1 is controlled to generate the maximum torque. Therefore, if charging is performed when the target charging amount Ptg exceeds the maximum warm-up charging amount Pgmax, the drive point is B, and the charging amount is limited to the maximum warm-up charging amount Pgmax.

Warm-up control of the battery 6 due to charging starts at the point C, and as the charge state SOC of the battery 6 gradually increases due to the charging, the permissible battery input power Pi gradually decreases accordingly, and the target engine output Pse also gradually decreases. Hence, the drive point of the engine 1 shifts from the point C to the point D. The torque of the engine 1 gradually varies, but the rotation speed of the engine 1 does not vary during this time.

In the same way, after the warm-up control of the battery 6 due to discharge has started at the point E, when the charge state SOC of the battery 6 gradually decreases due to discharge, the permissible battery output power Po gradually decreases and the target engine output Pse gradually increases. At this time, the drive point of the engine 1 gradually shifts from the point E to the point D. In this case also, the torque of the engine 1 gradually varies, but the rotation speed of the engine 1 does not vary.

Further, when control changes from charging to discharging, or from discharging to charging, the target engine output Pse varies in a step manner. However, in this case also, the rotation speed of the engine 1 does not vary although the torque of the engine 1 varies in a step manner.

In this way, during warm-up control of the battery 6, there is no variation in the rotation speed of the engine 1 regardless of the driver's intention, and variation in the rotation speed of the engine 1 due to charging/discharging of the battery 6 which imparts an uncomfortable feeling to the driver, is avoided.

In FIG. 3, the maximum torque line of the engine 1 is used to determine the target rotation speed command value, but the best fuel efficiency line shown by the dotted line may be used instead of the maximum torque line.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. A hybrid vehicle comprising:
    an engine;
    a generator connected to the engine which rotates in synchronism with the engine;
    a motor which drives a vehicle wheel;
    a battery which is electrically connected to the generator and the motor;
    a sensor which detects a state of the battery;
    a sensor which detects the rotation speed of the engine and generator; and
    a controller which functions to:
        compute a charge state of the battery based on the detected state of the battery,
        set a maximum charging power when the battery is warmed up, set a target rotation speed based on the sum of an engine output required to drive the vehicle and the maximum charging power, compute a target charging power when the battery is warmed up, based on the battery charge state, set a target engine torque by dividing a target engine output, obtained based on the sum of the engine output required to drive the vehicle and the target charging power, by the engine rotation speed, and when the battery is warmed up, control the rotation speed of the engine and generator to the target rotation speed and control the torque of the engine to the target engine torque.

2. The hybrid vehicle as defined in claim 1, further comprising:

a sensor which detects a temperature of the battery, and wherein:

the controller further functions to set the maximum charging power according to the battery temperature.

3. The hybrid vehicle as defined in claim 2, wherein:

the controller further functions to set the maximum charging power to decrease with an increase in battery temperature.

4. The hybrid vehicle as defined in claim 1, wherein:

the controller further functions to set the target rotation speed so that a power equal to the sum of the engine output required to drive the vehicle and the maximum charging power, can be output on maximum torque line of the engine.

5. The hybrid vehicle as defined in claim 1, wherein:

the controller further functions to set the target rotation speed so that a power equal to the sum of the engine output required to drive the vehicle and the maximum charging power, can be output on a best fuel efficiency line of the engine.

6. The hybrid vehicle as defined in claim 1, wherein:

the controller further functions to set the target rotation speed to a larger of the target rotation speed when the battery is warmed up, and a second target rotation speed found due to requirements other than battery warm-up.

7. The hybrid vehicle as defined in claim 1, wherein:

the controller further functions to:

compare a permissible input power of the battery computed based on the battery charge state with a discharge power of the battery, and compute the target charging power by selecting a power with the higher current flowing through the battery from the permissible input power and the discharge power.

8. The hybrid vehicle as defined in claim 1, wherein:

the controller further functions to amend the sum of the engine output required to drive the vehicle and the maximum charging power based on a loss of the generator and to set the target rotation speed based on the amended sum.

9. The hybrid vehicle as defined in claim 1, further comprising:

an auxiliary device connected to the battery, wherein:

the controller further functions to amend the engine output required to drive the vehicle based on a power consumption of the auxiliary device.

10. The hybrid vehicle as defined in claim 1, wherein:

the controller further functions to amend the target engine output based on a loss of the motor.

11. A hybrid vehicle comprising:

an engine;

a generator connected to the engine which rotates in synchronism with the engine;

a motor which drives a vehicle wheel;

a battery which is electrically connected to the generator and the motor;

means for detecting a charge state of the battery;

means for detecting the rotation speed of the engine and generator;

means for setting a maximum charging power when the battery is warmed up;

means for setting a target rotation speed based on the sum of an engine output required to drive the vehicle and the maximum charging power;

means for computing a target charging power when the battery is warmed up, based on the battery charge state;

means for setting a target engine torque by dividing a target engine output, obtained based on the sum of the engine output required to drive the vehicle and the target charging power, by the engine rotation speed; and means for controlling the rotation speed of the engine and generator to the target rotation speed and controlling the torque of the engine to the target engine torque when the battery is warmed up.

* * * * *